July 9, 1968 G. T. SINCERBOX 3,391,970
OPTICAL MEMORY IN WHICH A DIGITAL LIGHT DEFLECTOR
IS USED IN A BI-DIRECTIONAL MANNER
Filed June 30, 1964 4 Sheets-Sheet 1

INVENTOR
GLENN T. SINCERBOX
BY Ralph C. Dustin
ATTORNEY

United States Patent Office 3,391,970
Patented July 9, 1968

3,391,970

OPTICAL MEMORY IN WHICH A DIGITAL LIGHT DEFLECTOR IS USED IN A BI-DIRECTIONAL MANNER

Glenn T. Sincerbox, Poughkeepsie, N.Y., assignor to International Business Machines Corporation, New York, N.Y., a corporation of New York Filed June 30, 1964, Ser. No. 379,219
8 Claims. (Cl. 350—150)

ABSTRACT OF THE DISCLOSURE

Apparatus is provided for reading information from a storage medium utilizing light beams. A bidirectional light conducting system carries an interrogating light beam from a source to the storage medium where the beam is conditioned by the information. Apparatus acts on the conditioned light beam to provide it to the conducting system for return through this system carrying indicia of the information. The retrieved beam is separated from the system to obtain the information.

This invention relates to systems for reading and transmitting information by means of light, and more particularly to systems in which a beam of light is directed selectively to any one of a plurality of storage areas for reading information and then is returned to a common point at which apparatus is actuated by the light to provide an indication of the information read.

In a patent application, Ser. No. 317,754, filed Oct. 21, 1963 by Thomas J. Harris, there is described a system in which a light beam is directed by a first digital deflector through any selected character on a mask and then is returned in character shape by a second digital deflector to a common path. The light beam is then directed from the common path to selected locations on a light sensitive medium for effecting a printing of information. After the light beam passes through the character mask, it enters the second digital deflector at a point corresponding to the point at which the light leaves the first digital deflector. If, instead of using the second digital deflector, the light had been returned to the first digital deflector at the point of exit, it would have been returned to the point at which it entered the deflector. The polarization of the light in the returning beam would then, however, be the same as that of the original beam and there would be no way of separating the two beams to permit a reading of information in the returning beam. The beams could be separated by a common half silvered beam splitter but 75% of the light would be lost.

It has been discovered that a light beam, after passing through a deflector like that of the above application and having information stored therein, may then be returned through the same deflector to the point of entrance and at a different polarization. This may be accomplished by rotating the direction of polarization of the light beam containing information 90 degrees and returning it to the deflector at a point which is symmetric with respect to the point at which the light beam left the deflector on its first passage therethrough. Operating in this manner, it is possible to pass a beam of light polarized in one plane through the deflector to different points at which the beam is conditioned by stored information and then returned through the same deflector to the point at which the original beam entered it but polarized in a different direction. The returning light beam may then be directed, due to its change in polarization, by a beam splitter over a different path to a device which is responsive to the condition resulting from the stored information.

An object of this invention is to provide an improved system for reading stored information by means of light.

Another object is to provide a system in which a linearly polarized light beam is directed by a deflector to any one of a plurality of locations at which it is conditioned by stored information and then is returned through the same deflector to the path of the original beam but polarized in a different direction.

Still another object is to provide an improved system in which a single deflector is employed for directing a linearly polarized light beam to any one of a plurality of locations and then returning the beam to its original path but polarized in a different direction.

Yet another object is to provide in an improved system for reading information by means of light, a digital deflector through which a linearly polarized light beam is directed to a selected location for conditioning by stored information and then is returned at a different polarization to a point on the deflector symmetric with that at which the light beam left it for effecting a return of the beam to its original path but polarized in a different direction.

The foregoing and other objects, features and advantages of the present invention will be apparent from the following more particular description of the preferred embodiments of the invention as illustrated in the accompanying drawings.

Figure 1:
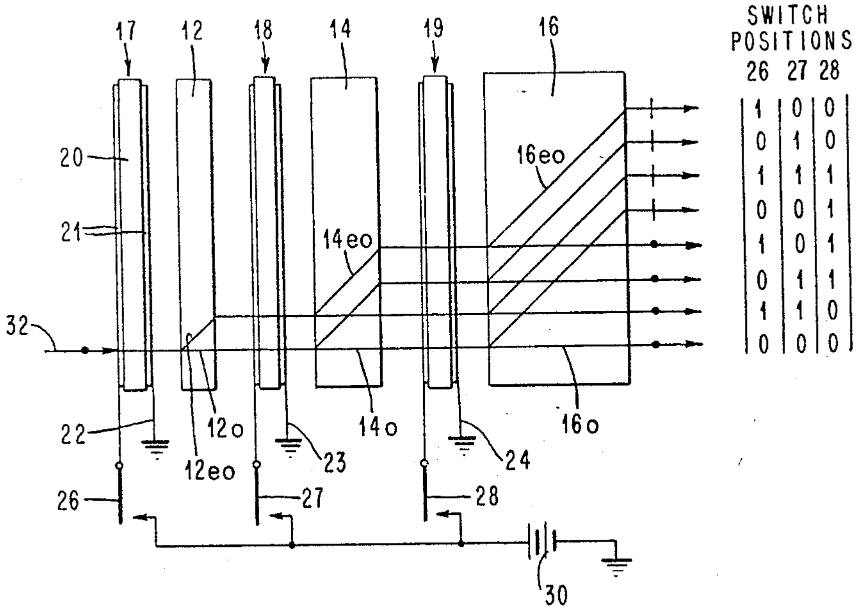
FIG. 1 is a schematic diagram of apparatus for digitally deflecting a beam of linearly polarized light.

There is shown in FIG. 1 of the drawings a digital deflector, generally designated 10, which is like the deflector described in the above-mentioned application. This deflector comprises birefringent elements 12, 14 and 16 which may be crystals cut specially to allow incoming plane polarized light to pass through them in one path or another as either an ordinary ray or an extraordinary ray but not both simultaneously. The path followed depends upon the direction in which the beam entering the crystal is polarized. A beam plane polarized perpendicular to the plane of the drawing will pass, for example, through the crystal without deflection as the ordinary ray. If the light is polarized parallel to the plane of the drawing, it will be deflected and pass as the extraordinary ray over a different path. The spacing between the points at which the ordinary and the extraordinary rays leave a crystal is directly proportional to the thickness of the crystal. As shown in FIG. 1, the thickness of the crystals 12, 14 and 16 increases by a factor of two. With this arrangement, the number of levels at which an output of light may be obtained is equal to two raised to a power equal to the number of crystals. Since three crystals have been shown, an output could be obtained at any one of eight levels.

At the input sides of the birefringent elements 12, 14 and 16 are electro-optic devices 17, 18 and 19. Each of these devices is made up of an electro-optic crystal 20, such as a potassium dihydrogen phosphate crystal, between a pair of transparent electrodes 21. When a potential of sufficient magnitude is applied across any one of the electro-optic devices, a beam of polarized light passing through it has its direction of polarization rotated by 90 degrees. For applying such potential selectively across these devices, one electrode of each device is connected to ground at points 22, 23 and 24 while the other electrodes are connected through switches 26, 27 and 28 to one side of a potential source 30 which is connected at its other side to ground. Mechanical switches are shown herein only to provide an understanding of the invention. In actual practice, electronic switching means responsive to coded electric pulses would be used.

A collimated light beam 32 polarized in a plane perpendicular to the plane of the drawing is supplied to the deflector as shown. With all of the switches 26, 27 and 28 open, the light beam passes through each of the birefringent crystals 12, 14 and 16 without deflection as the ordinary ray 120, 140 and 160. Maximum deflection is obtained when the switch 26 is closed to apply a potential across the electro-optic device 17 and the other switches are left open. The light beam has its plane of polarization rotated 90 degrees by the device 17 and passes through the crystals 12, 14 and 16 as the extra-ordinary ray along the paths 12*eo*, 14*eo* and 16*eo*. If the switch 27 had also been closed, the plane of polarization would have been rotated again 90 degrees by the electro-optic device 18 to pass the ordinary ray through the crystals 14 and 16 without deflection. The total displacement would then have been only that which took place in the element 12. By closing the switches either singly or in combination it is possible to obtain deflections proportional to the thickness of any crystal or combination of crystals. The positions of the switches to obtain an output of light from the deflector at the different levels are indicated at the right side of FIG. 1 where (0) indicates an open switch and (1) indicates a closed switch. The directions of polarization of the light beam at the different levels are also indicated at the points of output. It will be noted that the light is polarized in the plane of the drawing for each of the top four levels and is polarized in a plane perpendicular to the drawing for each of the four lower levels.

Figure 2:
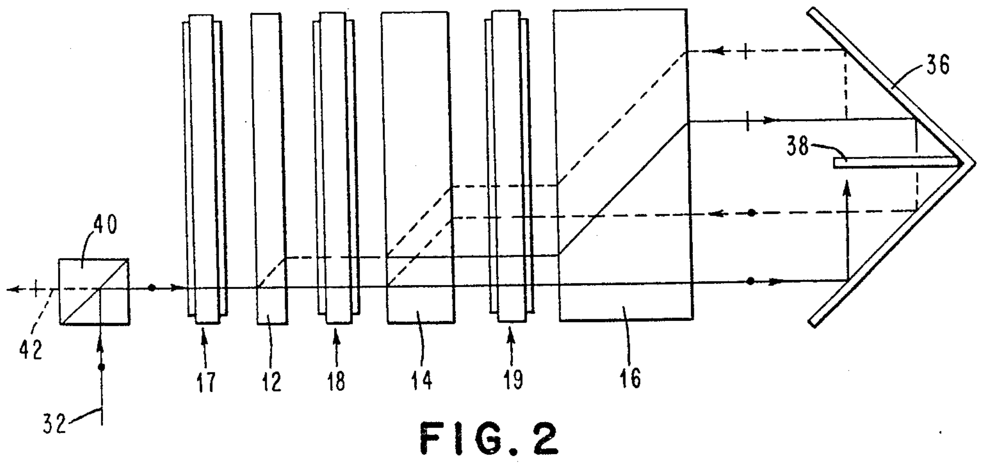
FIG. 2 is a diagram of the deflector of FIG. 1 having apparatus associated therewith for returning the beam to its original path but polarized in a different direction.

If a roof-top reflector 36 (FIG. 2) is now located at the output side of the deflector with its apex lying in the horizontal center line of the deflector and its sides extending at 45 degrees to such line, a light ray from any output position will be reflected back into the deflector at a position which is symmetrical to the output position. By arranging a half-wave plate 38 so that all of the rays reflected between the sides of the reflector 36 pass through it, then each ray reflected back to the deflector becomes polarized in a direction at 90 degrees to its direction of polarization at its output position. Any ray returned to the deflector at a position symmetric to its output position and changed in its direction of polarization by 90 degrees, passes through the deflector over a path which returns to the point at which the original light beam entered the deflector. The reflected light reaching this point is also polarized in a direction at 90 degrees to the direction of polarization for the original beam. There is shown in FIG. 2 the paths followed by two light rays while passing in both directions through the deflector. One passes as the ordinary ray straight through the deflector to the lowest output position and then is returned by the reflector 36 to the top position with a 90 degree change in polarization. This ray then passes as the extraordinary ray through each of the crystals so it follows the path of the broken line to the starting point. The other ray is deflected upwardly in crystals 12 and 16 to exit at a position above the center of the deflector. This ray is then returned by the reflector 36 to a position below center and is deflected downwardly in crystal 14 to the path of the original beam. When operating in this manner, the original beam 32 may be directed to the deflector by a beam splitter 40 so that the reflected light passes straight through the beam splitter as a light beam 42 to permit a reading of any information that may be imparted to it.

Figure 3:
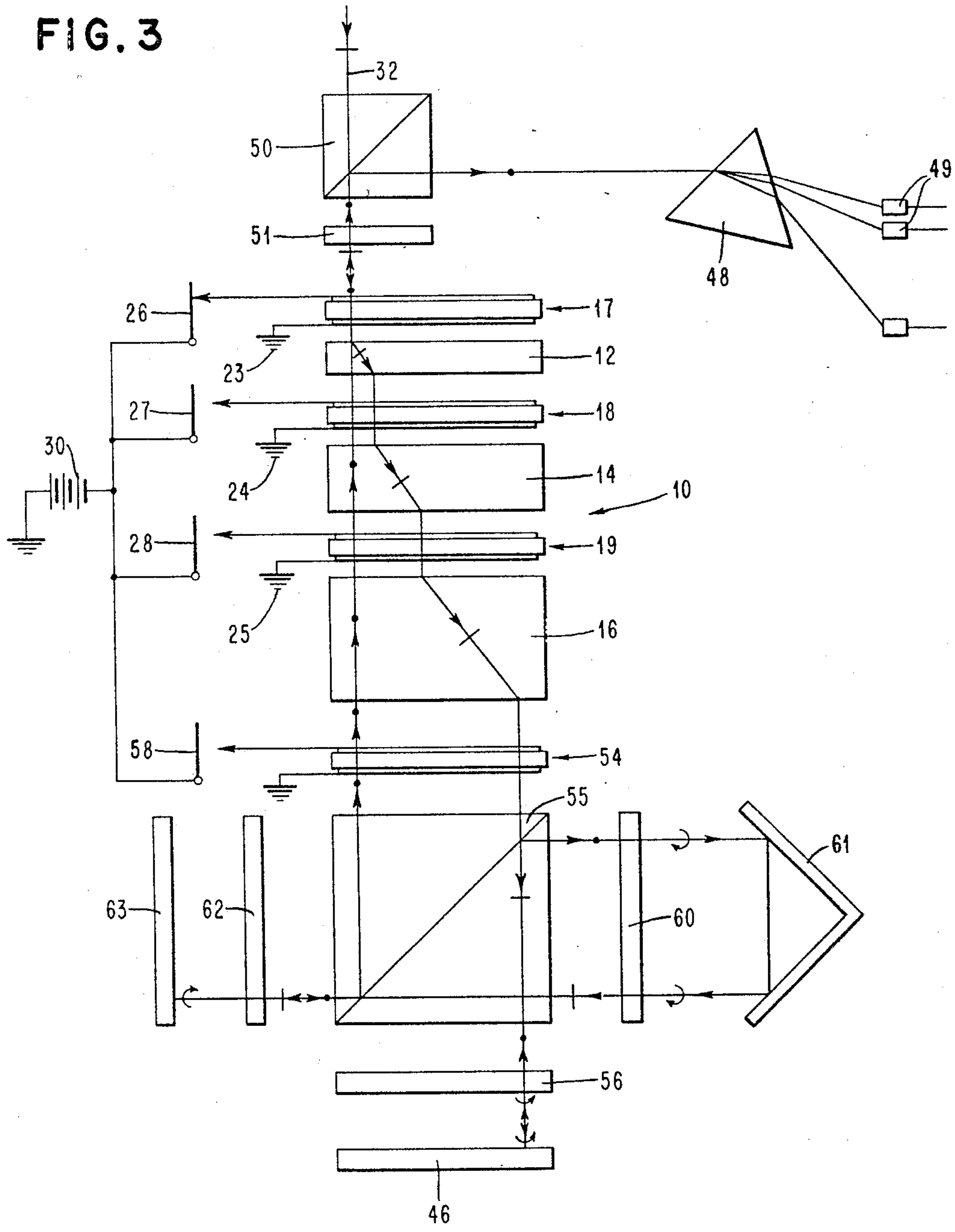
FIG. 3 is a schematic diagram of a system embodying the deflector of FIG. 1 for reading information from selected points on a storage device.

There is shown in FIG. 3 a system in which a digital deflector 10 like that of FIGS. 1 and 2 is employed for directing a light beam to any one of a plurality of locations on an information storage device 46. Light reflected from this device in accordance with information stored is directed, by mechanisms to be described, back through the deflector and a prism 48 to photo-detectors 49 which emit electric pulses when light is directed upon them. The storage device 46 consists of a transparent film having thin layers of reflecting material spaced at periodic intervals. The layers are originally formed by directing light through a light sensitive medium such as photographic emulsion and reflecting the same light back through the emulsion. A standing wave is set up for each monochromatic light frequency, and the emulsion is modified at the antinodes of the standing waves so that, after processing and fixing, a plurality of reflecting layers are formed in the film spaced at periodic intervals proportional to each anharmonic frequency of the light employed. When light is directed through a film having such reflecting layers one of its component frequencies is coherently reflected if its frequency is the same as that of the light which originally caused the formation of the layers. Each location on the film may have a plurality of sets of reflecting layers formed by light of different frequencies. When white light is directed upon a location having more than one set of layers, light at a frequency corresponding to each set is reflected back through the system.

The beam 32 supplied to the system of FIG. 3 for reading stored information is collimated white light polarized in the plane of the drawing. This passes straight through a beam splitter 50 and a half wave plate 51 which rotates the polarization to a plane perpendicular to the drawing. As shown by the drawing, switch 26 is closed while switches 27 and 28 are open. Since the electro-optic device 17 is energized, it rotates the direction of polarization to the plane of the drawing so the light passes through crystal 12 as the extraordinary ray. With the electro-optic devices 18 and 19 deenergized, no effect is had by them on the direction of polarization and the light continues through the crystals 14 and 16 as the extraordinary ray. A deflection of light takes place in each of the crystals and leaves the deflector at a point spaced maximum distance from the point at which it would have left if the light had passed through the crystals as the ordinary ray.

At the output side of the deflector is an electro-optic device 54, a beam splitter 55 and a quarter-wave plate 56 through which the light is directed to the storage device 46. With the light at the output end of the deflector polarized in the plane of the drawing, there is no need to change its direction of polarization in order to pass straight through the beam splitter. A switch 58 controlling the energization of the electro-optic device 54 is, therefore, left open when light is emitted from the deflector at the maximum deflected position. It will be noted in FIG. 1 that light emitted from the four highest deflected positions is always polarized in the plane of the drawing while that from the four lowest positions is always polarized perpendicular to the plane of the drawing. Switch 58 is, therefore, left open when light is received from the first four positions and closed when received from any one of the second four positions. In this application switch 58 will always operate at the same time as switch 28 so they may be connected for operation together. With switch 58 closed, the electro-optic device 54 causes a rotation of the plane of polarization by 90 degrees.

As the light passes through the quarter-wave plate 56 it becomes circularly polarized and, under that condition, acts upon the storage device 46. If this device has sets of reflecting layers at the point where the light acts upon it, then light at corresponding frequencies is reflected back through the plate 56 and becomes polarized in a plane perpendicular to the drawing. The reflected light is now deflected by the beam splitter 55 through a quarter-wave plate 60 to a roof-top reflector 61 having its apex located on the horizontal center line of the beam splitter 55 and its sides extending at 45 degrees to this line. As the reflected light passes through the plate 60 it becomes circularly polarized and is returned by the reflector 61 to the plate 60 still circularly polarized. Passing through the plate 60 again, the light becomes linearly polarized in the plane of the drawing and passes straight through the beam splitter 55 at a point symmetric with the point at which it left the beam splitter. At the left side of the beam splitter 55 is another quarter-wave plate 62 through which the light passes to a mirror 63. On passing through the plate 62 the first time, the light becomes circularly polarized. As it is reflected by the mirror 63 back through the plate 62 it becomes linearly polarized perpendicular to the plane of the drawing and is deflected by the beam splitter 55 upwardly through the electro-optic device 54 to the deflector 10. Since the electro-optic device is de-energized, the reflected light passes through it without change in its direction of polarization and enters the crystal 16 at a point symmetrical to that at which the light beam originally left the crystal. Being linearly polarized in a direction perpendicular to the plane of the drawing, the light passes through the crystals 16, 14 and 12 without deflection and leaves the deflector in the same path as the original light beam. As the returning light passes through the electro-optic device 17, its direction of polarization is rotated to the plane of the drawing since the device is energized. The half-wave plate 51 then rotates the plane of polarization 90 degrees to a direction perpendicular to the drawing so the returning light is deflected by the beam splitter 50 to the prism 48. This prism causes the portions of the light at different frequencies to be deflected over different paths to the corresponding photo-detectors which emit electric pulses to any suitable apparatus not shown, for indicating the information read.

By closing the switches 26, 27 and 28 singly or in combination, the light beam 32 may be caused to leave the deflector 10 at any one of a plurality of selected points for reading information from the storage device 46. Light reflected from the device 46 is always returned to the deflector 10 at a point symmetric with that at which it leaves the deflector when passing to the storage device, and its plane of polarization is always rotated 90 degrees to the plane of polarization when leaving the deflector. Under these conditions, the reflected light is always returned to the input side of the deflector in alignment with the original beam 32 but polarized in such direction that the beam splitter 50 deflects the light to the prism 48.

Figure 4:
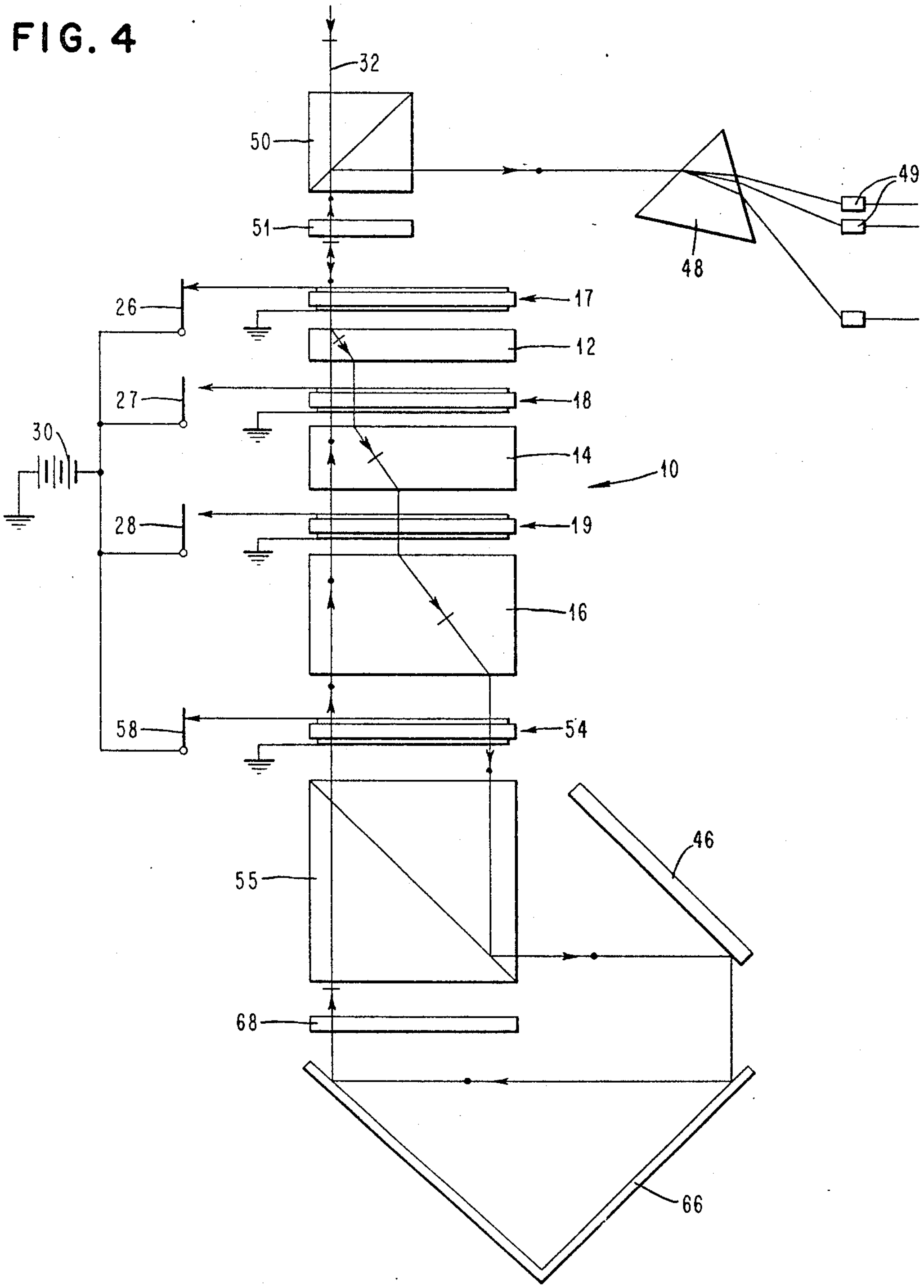
FIG. 4 is a schematic diagram of a system similar to that of FIG. 3.

FIG. 4 shows a system like that of FIG. 3 except for the arrangement of mechanisms at the output side of the deflector 10. In this case the information storage device 46 is arranged at one side of the beam splitter 55 and receives light deflected by the latter from the output side of the deflector. Since the polarization of the light at the output side of the deflector in the example shown is in the plane of the drawing and it is necessary that the direction of polarization be in a plane perpendicular to the drawing in order that the light be deflected to the storage device 46, the switch 58 is closed for energizing the electro-optic device 54. It will be appreciated that the position of the switch 58 will be opposite that required in FIG. 3 for each point to which the light beam may be deflected. The storage device 46 is arranged at an angle of 45 degrees to the path of the light received from the beam splitter so that the reflecting layers within the storage device reflect the light downwardly to one side of a roof-top mirror 66. Light is then reflected to the opposite side of the mirror which, in turn, reflects it through a half-wave plate 68 and the beam splitter 55 to the deflector. The mirror 66 is so arranged that the light reflected to the deflector enters the latter at a point symmetric with that at which it originally left the deflector. Half-wave plate 68 rotates the direction of polarization to the plane of the drawing so the light passes straight through the beam splitter and then the electro-optic device 54 rotates the direction of polarization again to a plane perpendicular to the drawing so the light passes through the crystals 16, 14 and 12 as the ordinary ray.

Figure 5:
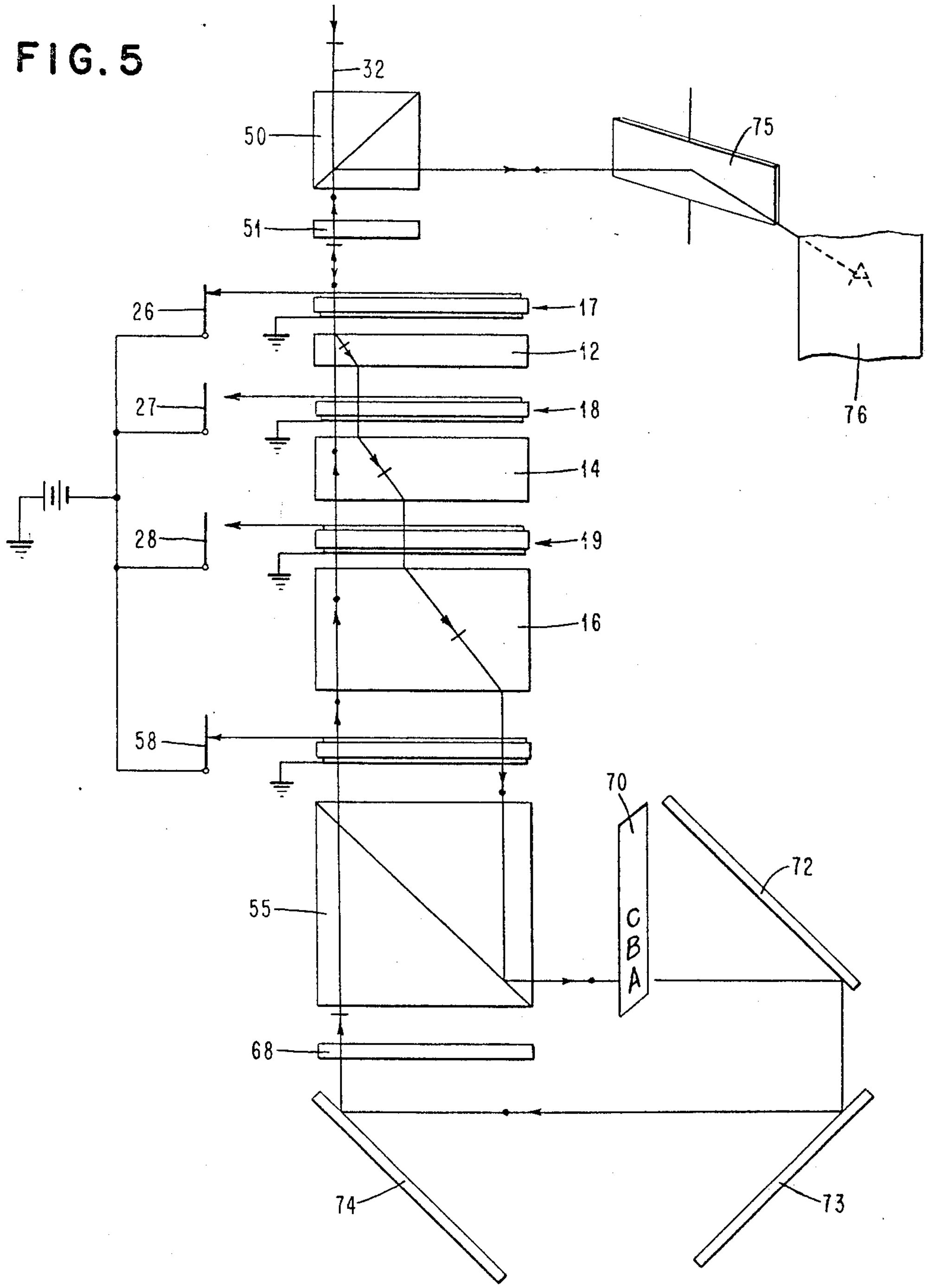
FIG. 5 is a schematic diagram of a system similar to that of FIG. 4 but operating to read and print characters.

FIG. 5 shows a system like that of FIG. 4 except that a character mask 70 is substituted for the information storage device. This mask is made of an opaque material but has transparent portions in the shape of different characters. The frequency of the light used in this system is of no consequence but should be coherent such as that obtained from a laser. The system is similar to that described in the above-mentioned application by T. J. Harris except that the deflector which directs the light beam to a selected character also returns the light beam to a common path. By providing a second deflector for directing the light beam to different planes parallel to that shown, as is done in the Harris application, any desired number of characters may be read from the mask. As the light passes through a character portion on the mask it takes the shape of the character and is reflected from a mirror 72 to mirrors 73, 74 and back to the deflector. After passing through the deflector, the light is deflected by the beam splitter 50 to a rotating mirror 75 which reflects the light beam in character shape to the surface of a photosensitive medium 76.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for reading and transmitting stored information by means of light comprising, in combination,
- means for storing information and operative when a light beam is incident on a selected location of it to condition the beam in accordance with the information stored at that location,
- means for directing a linearly polarized light beam from a given path to any selected location on the storing means,
- said directing means including a light deflector having a plurality of birefringent crystals arranged in the path of said light beam, said light beam passing through each of said crystals in one or another of two paths depending on its plane of polarization,
- an electro-optic device arranged at the input side of each of said crystals and normally having no effect on the light beam but operating when energized to rotate its plane of polarization by 90 degrees,
- means for returning the conditioned light beam from said storing means to a location at said deflector, the location of return to the deflector and the location at which the light passed from the deflector to said storage means being symmetrically located with respect to the center line of the deflector,
- means for rotating the plane of polarization of said conditioned light beam before it re-enters said deflector to a plane orthogonal to the plane of polarization of the beam passed from the deflector,
- the directing means being operative to accept the conditioned beam polarized in a plane orthogonal to the plane of polarization of the beam passed from the deflector for return to the given path, and
- means for separating the condition beam from the system after passage through the directing means.

2. The system of claim 1 wherein the separating means comprises a beam splitter arranged in the path of said light beam at the input side of said deflector and operating to pass light in one direction or another depending on its direction of polarization.

3. The system of claim 2 including means arranged to receive from said beam splitter any light conditioned by said storage device and operating under the action of said light for indicating the information read.

4. The system of claim 1 in which said storing means comprises a transparent film having surfaces adapted to reflect light at predetermined frequencies as a representation of stored information, and in which the separating means comprises a beam splitter in the path of said light beam at the input side of said deflector and operating to pass light in one direction or another depending on its direction of polarization, and means arranged to receive from said beam splitter any light reflected from said storage device and to indicate the frequency of the light received.

5. The system of claim 1 in which said storing means comprises a character mask having transparent portions in character shapes at said different points, each of said portions operating to form a light beam directed thereto in its character shape, and in which the separating means comprises a beam splitter in the path of said light beam at the input side of said deflector and operating to pass light in one direction or another depending on its direction of polarization, and means arranged to receive from said beam splitter any light formed in a character shape by said storage device, said last-mentioned means operating in response to the light received for displaying said character.

6. The system of claim 1 in which said means for returning the conditioned light beam from said storing means to said deflector includes a roof-top reflector arranged to receive light from any output point on said deflector and to reflect it back to said location of return to the deflector.

7. The system of claim 1 in which said means for returning said conditioned light beam from said storing means to said deflector comprises a beam splitter arranged between said storing means and said deflector, a phase plate between said beam splitter and said storing means for rotating the plane of polarization of light passing therethrough to effect its passage through said beam splitter over a different path, and means for reflecting light from said storing means through said beam splitter over a path to enter said location of return to the deflector.

8. Apparatus for directing a beam of linearly polarized light from a given path to any one of a plurality of points on a storage medium and returning said light beam to said given path conditioned according to the information contained on the medium and polarized in a different plane comprising, in combination, a light deflector including a plurality of birefringent crystals arranged in the path of said light beam for directing the beam to the storage medium, said light beam passing through each of said crystals in one or another of two paths depending on its plane of polarization, an electro-optic device arranged at the input side of each of said crystals and normally having no effect on the light beam but operating when energized to rotate its plane of polarization by 90 degrees, means at the output side of said deflector for reflecting a light beam from any point on the medium back into the deflector, the location of re-entry back into the deflector and the location of exiting from the deflector on the path to the storage medium being symmetrically located with respect to the center line of the deflector, and means for rotating the plane of polarization of said light beam as it passes between said point on the medium and the location of re-entry back into the deflector to a plane orthogonal to the plane of polarization of the beam exiting from the deflector.

References Cited

UNITED STATES PATENTS

| | | | |
|---|---|---|---|
| 2,958,258 | 11/1960 | Kelly | 350—152 |
| 3,144,807 | 8/1964 | Coombs | 350—285 |

DAVID H. RUBIN, *Primary Examiner.*

JEWELL H. PEDERSEN, *Examiner.*

R. J. STERN, *Assistant Examiner.*